US 8,923,635 B2

(12) United States Patent
Tanaka

(10) Patent No.: US 8,923,635 B2
(45) Date of Patent: Dec. 30, 2014

(54) IMAGE PROCESSING APPARATUS AND IMAGE PROCESSING PROGRAM

(75) Inventor: Eiichi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 513 days.

(21) Appl. No.: 12/878,110

(22) Filed: Sep. 9, 2010

(65) Prior Publication Data

US 2011/0211769 A1    Sep. 1, 2011

(30) Foreign Application Priority Data

Feb. 26, 2010   (JP) .................... 2010-041912

(51) Int. Cl.
*G06K 9/36* (2006.01)
*G06K 9/34* (2006.01)
*G06T 7/00* (2006.01)

(52) U.S. Cl.
CPC .............. *G06K 9/342* (2013.01); *G06T 7/0083* (2013.01); *G06T 7/0089* (2013.01); *G06T 2207/10008* (2013.01)
USPC ............ 382/233; 382/282; 382/197; 382/176

(58) Field of Classification Search
CPC .... G06K 9/342; G06T 7/0083; G06T 7/0089; G06T 2207/10008
USPC ......... 382/282, 321, 197, 199, 218, 128, 173, 382/176, 190, 195, 280, 233
See application file for complete search history.

(56) References Cited

U.S. PATENT DOCUMENTS

| | | | |
|---|---|---|---|
| 3,732,401 A * | 5/1973 | Donohue et al. | ............. 235/436 |
| 4,635,290 A * | 1/1987 | Tsuji et al. | .................... 382/174 |
| 5,677,776 A * | 10/1997 | Matsuda et al. | ............ 358/475 |
| 5,821,519 A * | 10/1998 | Lee et al. | ................. 235/462.27 |
| 6,000,614 A * | 12/1999 | Yang et al. | .................... 235/460 |
| 6,550,682 B2 * | 4/2003 | Ashiura | .................... 235/462.25 |
| 6,628,837 B1 | 9/2003 | Greene et al. | |
| 7,095,891 B1 | 8/2006 | Takebe et al. | |
| 7,379,594 B2 * | 5/2008 | Ferman et al. | ................ 382/176 |

(Continued)

FOREIGN PATENT DOCUMENTS

| | | |
|---|---|---|
| JP | A 4-068481 | 3/1992 |
| JP | A 4-092992 | 3/1992 |

(Continued)

OTHER PUBLICATIONS

TSE et al., "An OCR-Independent Character Segmentation Using Shortest-Path in Grayscale Document Images," IEEE, Sixth International Conference on Machine Learning and Applications, 2007, pp. 142-147.

(Continued)

*Primary Examiner* — Mekonen Bekele
(74) *Attorney, Agent, or Firm* — Oliff PLC

(57) ABSTRACT

An image processing apparatus includes a first path information calculating unit, a second path information calculating unit, and a path selecting unit. The first path information calculating unit calculates first path information which is information representing a first path for separating areas from an image. The second path information calculating unit calculates second path information representing a second path for separating the areas from the image, the second path being the reverse of the first path. The path selecting unit selects one of the first path information calculated by the first path information calculating unit and the second path information calculated by the second path information calculating unit.

7 Claims, 18 Drawing Sheets

(56) References Cited

U.S. PATENT DOCUMENTS

| | | | |
|---|---|---|---|
| 8,036,465 B2* | 10/2011 | Khomo | 382/187 |
| 8,385,679 B2* | 2/2013 | Moon et al. | 382/274 |
| 8,457,404 B2* | 6/2013 | Tanaka | 382/177 |
| 8,787,676 B2* | 7/2014 | Tanaka | 382/197 |
| 2005/0084149 A1* | 4/2005 | Aizawa et al. | 382/154 |
| 2005/0270580 A1* | 12/2005 | Maki | 358/1.18 |
| 2011/0211224 A1* | 9/2011 | Arita | 358/1.15 |
| 2011/0262165 A1* | 10/2011 | Takeuchi et al. | 399/67 |
| 2012/0033887 A1* | 2/2012 | Tanaka | 382/176 |
| 2012/0050295 A1* | 3/2012 | Tanaka | 345/467 |

FOREIGN PATENT DOCUMENTS

| | | |
|---|---|---|
| JP | A 4-100189 | 4/1992 |
| JP | A 5-114047 | 5/1993 |
| JP | A 9-054814 | 2/1997 |
| JP | 09-204531 | 8/1997 |
| JP | A-09-204531 | 8/1997 |
| JP | 2001-022888 A | 1/2001 |
| JP | A-2001-22888 | 1/2001 |
| JP | 2002-015278 A | 1/2002 |
| JP | A-2002-15278 | 1/2002 |
| JP | 2004-107998 A | 4/2004 |
| JP | A-2004-187998 | 7/2004 |
| JP | 2006-155126 A | 6/2006 |
| JP | A-2006-155126 | 6/2006 |

OTHER PUBLICATIONS

Lee et al., "A New Methodology for Gray-Scale Character Segmentation and Recognition," IEEE Transactions on Pattern Analysis and Machine Intelligence, vol. 18, No. 10, Oct. 1996, pp. 1045-1050 and Erratum from IEEE Transactions on Pattern Analysis and Machine Intelligence, vol. 18, No. 12, Dec. 1996, p. 1262.

Office Action issued in Japanese Application No. 2010-041912 dated Feb. 4, 2014.

English Translation of Japanese Office Action for Application No. 2010-041912 mailed Feb. 4, 2014.

* cited by examiner

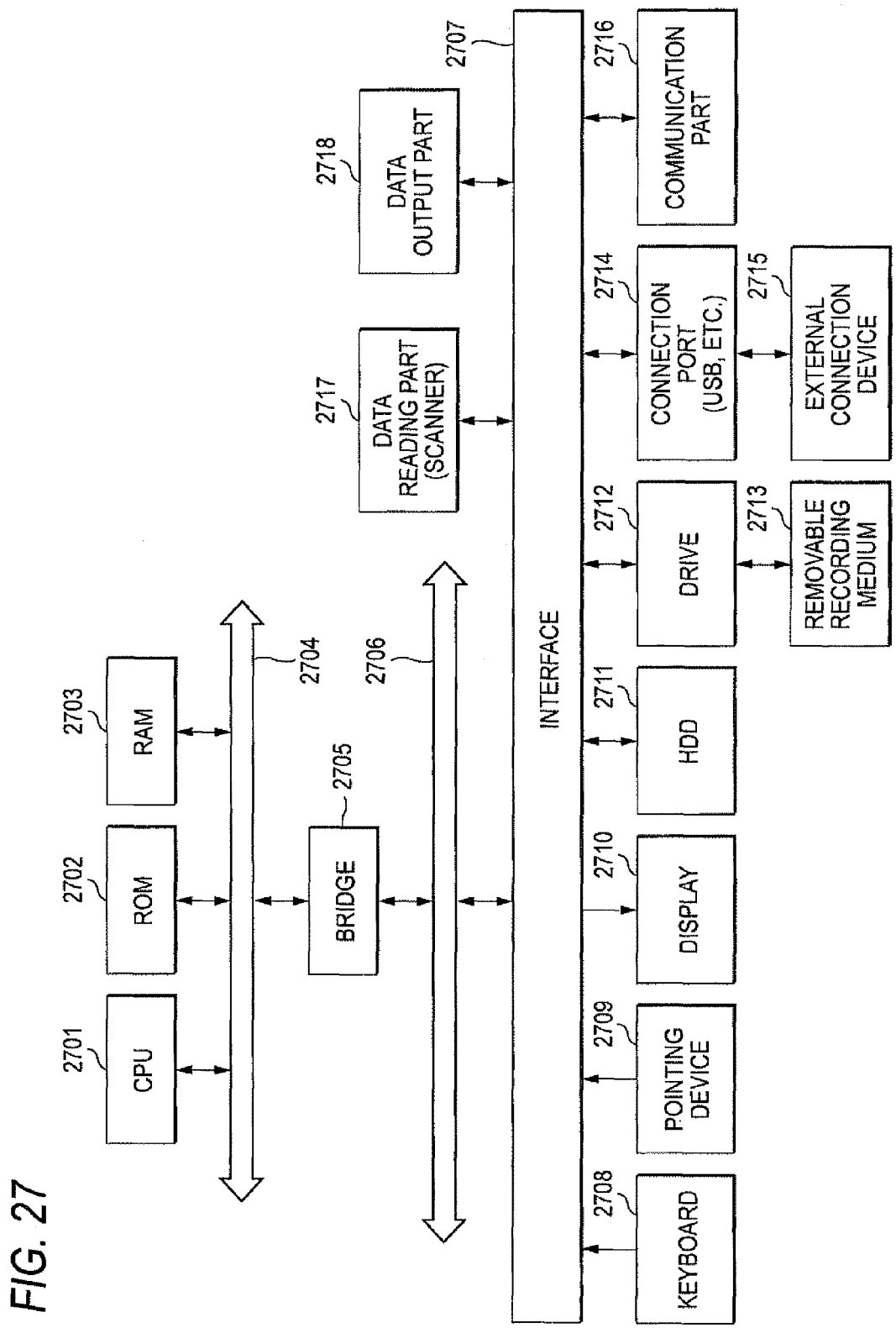

IMAGE PROCESSING APPARATUS AND IMAGE PROCESSING PROGRAM

CROSS-REFERENCE TO RELATED APPLICATIONS

This application is based upon and claims priority under 35 USC 119 from Japanese Patent Application No. 2010-041912, filed Feb. 26, 2010.

BACKGROUND

1. Technical Field

The present invention relates to an image processing apparatus and an image processing program.

2. Related Art

There are techniques for separating target areas from an image. Examples of such techniques include a technique for segmenting a character image area for each character from a document image.

SUMMARY OF THE INVENTION

According to an aspect of the invention, an image processing apparatus includes a first path information calculating unit, a second path information calculating unit, and a path selecting unit. The first path information calculating unit calculates first path information which is information representing a first path for separating areas from an image. The second path information calculating unit calculates second path information representing a second path for separating the areas from the image, the second path being the reverse of the first path. The path selecting unit selects one of the first path information calculated by the first path information calculating unit and the second path information calculated by the second path information calculating unit.

BRIEF DESCRIPTION OF THE DRAWINGS

Exemplary embodiments of the invention will be described in detail based on the following figures, wherein:

FIG. 27 is a block diagram showing an example of a hardware configuration of a computer which implements the present exemplary embodiment.

DETAILED DESCRIPTION

First, an outline of the present exemplary embodiment will be described below.

The present exemplary embodiment relates to an image processing apparatus which separates (also referred to as "segments" or "extracts" or the like) areas from an image. Such separation of areas from the image requires the determination of a contour surrounding the areas. Thus, a shortest path is employed as the contour surrounding the areas. This shortest path is intended to separate the areas from the image.

Figure 1:
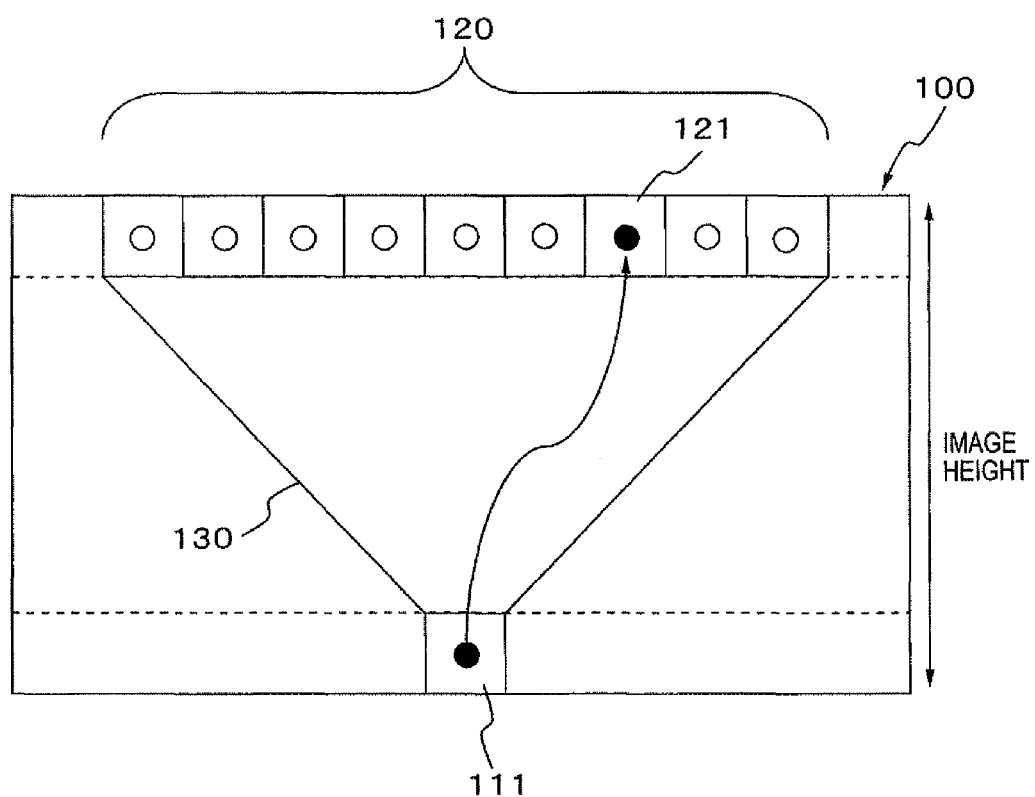
FIG. 1 is an explanatory view showing an example of a path for separating an image into areas.

As used herein, the shortest path refers to a line pattern, which is a one-dimensional arrangement of positions of pixels on a target image, and indicates a path having the minimum or maximum cost within a given range, with an accumulative value of luminescence values of pixels on the path as the cost. In particular, in the present exemplary embodiment, as illustrated in FIG. 1, the shortest path corresponds to a contour for separating an image 100 into areas and refers to a path having a start point 111 corresponding to a pixel in the bottom of the image 100 and an end point 121 corresponding to a pixel which lies in the top of the image 100 and is defined such that an accumulative value of luminescence values of pixels on the path becomes the minimum or the maximum, among end point candidates 120 preset as a set of end point candidates. When the start point 111 and the end point candidates 120 are determined, a movement range 130 is also determined.

The minimum cost or the maximum cost as used herein is not necessarily the minimum or the maximum. In this exemplary embodiment, the minimum cost or the maximum cost is a decision condition for extracting a path and is sufficient if a cost of the path (an accumulative value of luminescence values of pixels on the path) is smaller or larger than the costs of other paths. Therefore, unless otherwise stated, in addition to the path having the minimum cost or the maximum cost within compared ranges, the shortest path may be a path for selecting the second or the like from the minimum cost or the maximum cost or a path for selecting a plurality of costs such as the first and second and so on from the minimum cost or the maximum cost as a decision condition for achieving an object of extracting a path to separate an image.

Next, determination of a separation path using a convergence of the shortest path will be described.

Figure 2:
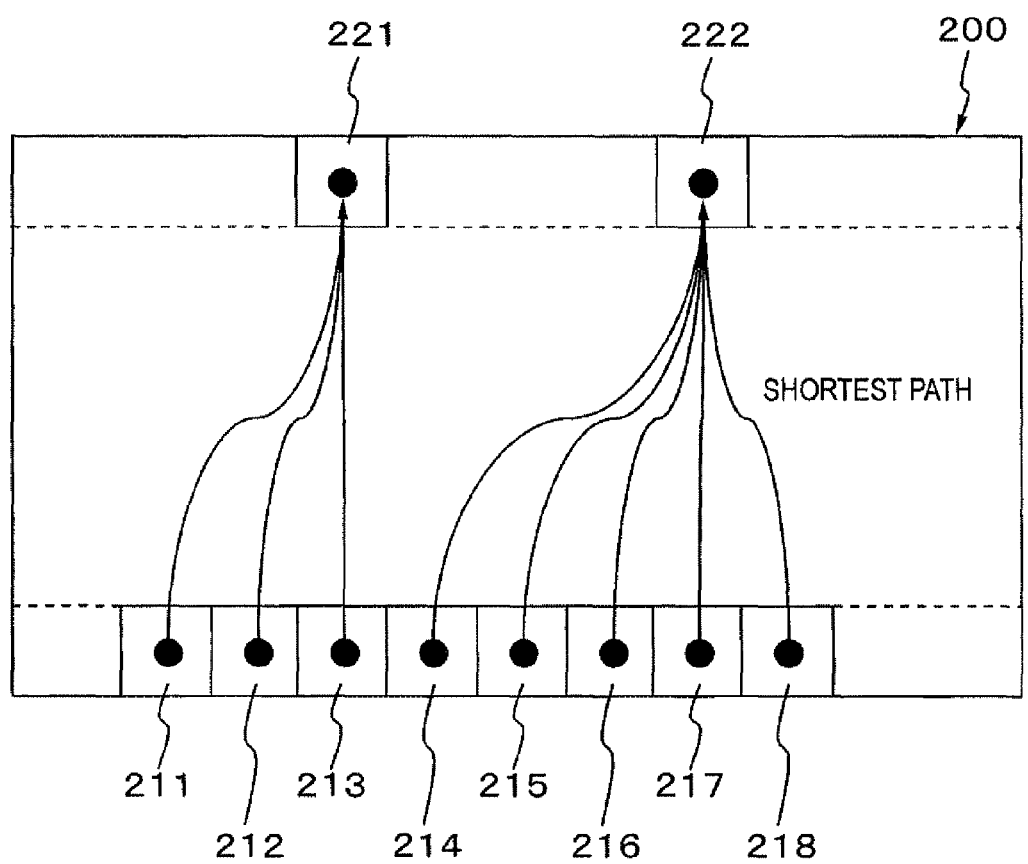
FIG. 2 is an explanatory view showing an example where a plurality of paths having different start points has the same end point.

The present exemplary embodiment uses a plurality of paths having different start points but the same end point for the above-mentioned shortest path (hereinafter called "path convergence"). This is schematically shown in FIG. 2 by way of example. FIG. 2 is an explanatory view showing an example where a plurality of paths having different start points has the same end point. Specifically, this figure shows a target image 200 in which the shortest path starting from three start points 211 to 213 reaches one end point 221 and the shortest path starting from five start points 214 to 218 reaches another end point 222.

Hereinafter, separation of a plurality of mono-characters from an accepted character string image including the plurality of mono-characters will be mainly illustrated.

In the present exemplary embodiment, a path for separating mono-characters from each other is calculated for the character string image based on information of the shortest path. Such a process corresponds to the extracting process of the separation area candidates based on the projection information or the connection components in the techniques disclosed in the above-described related art documents.

Hereinafter, the determination of the separation path using the path convergence will be described with reference to FIGS. 3 to 10 by way of example.

Figure 3:
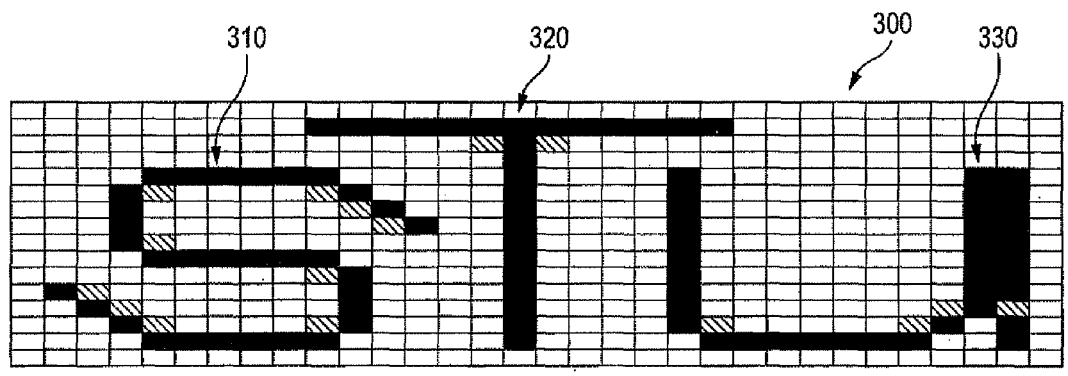
FIG. 3 is an explanatory view showing an example of a target image.
Figure 4:
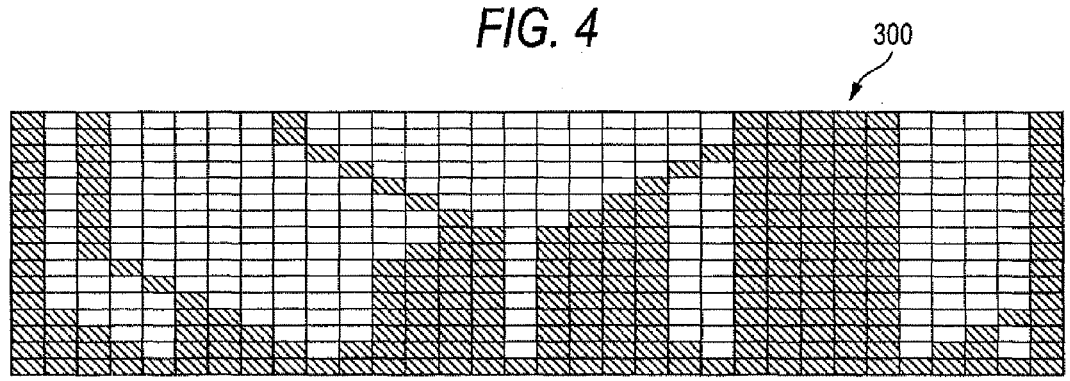
FIG. 4 is an explanatory view showing an example of the shortest path to the upper direction.
Figure 5:
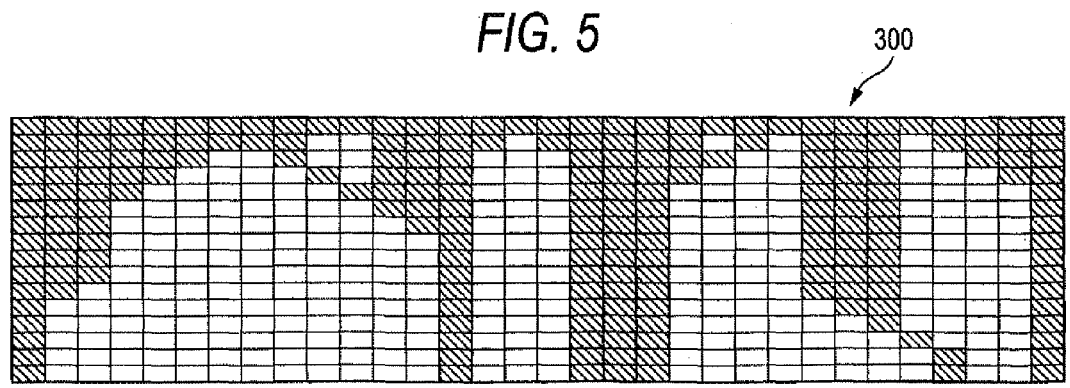
FIG. 5 is an explanatory view showing an example of the shortest path to the lower direction.

FIG. 3 is an explanatory view showing an example of a target image. An image 300 includes a character image 310 of "S," a character image 320 of "T," and a character image 330 of "U," which have an overlapping pattern when they are mapped. Cells represent pixels and their values represent luminescence values of the pixels. Calculation of the shortest path for the example shown in FIG. 3 is shown in FIGS. 4 and 5 by way of example. For the cell values, 1 indicates the presence of a path and 0 indicates the absence of a path. The example of FIG. 4 shows the upward shortest path on which all pixels in the bottom are taken as start points and pixels in the top are taken as end points. The example of FIG. 5 shows the downward shortest path on which all pixels in the top are taken as start points and pixels in the bottom are taken as end points. From these figures, it may be seen that paths are converged. That is, since the number of end points is smaller than the number of start points, a plurality of paths having different start points has the same end point.

Figure 6:
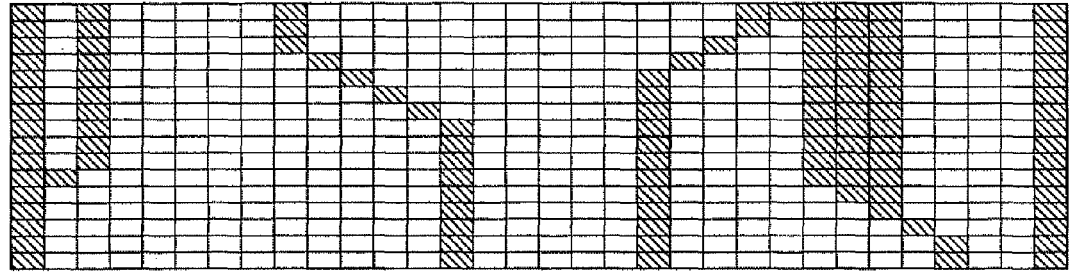
FIG. 6 is an explanatory view showing an example of the shortest path obtained by one round-trip.

In the present exemplary embodiment, when all the end points in the example of FIG. 4 are assumed as start points, a process of calculating the downward shortest path is performed. A result of this process is shown in FIG. 6 by way of example. In this manner, paths are further converged by an operation of calculating paths with end points of all paths in one direction as start points in the other direction (hereinafter referred to as "round-trip"). That is, FIG. 6 is an explanatory view showing an example of the shortest path obtained by one round-trip (from upward to downward).

Figure 7:
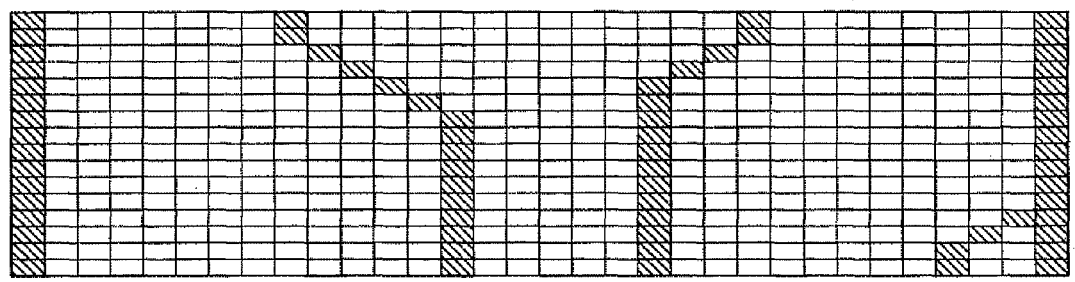
FIG. 7 is an explanatory view showing an example of the shortest path obtained by two round-trips.
Figure 8:
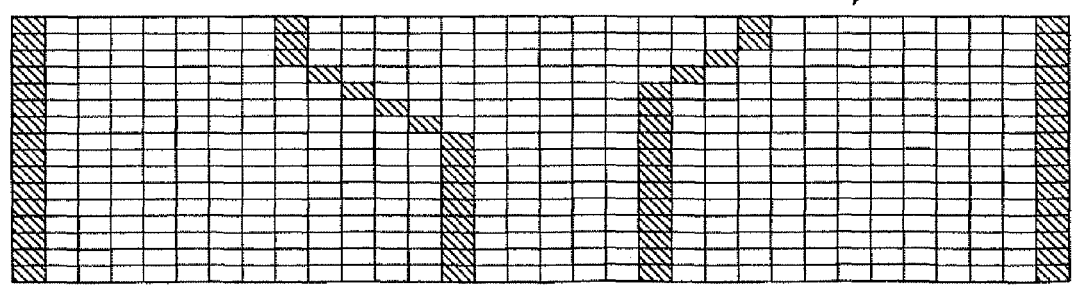
FIG. 8 is an explanatory view showing an example of the shortest path obtained by three round-trips.
Figure 9:
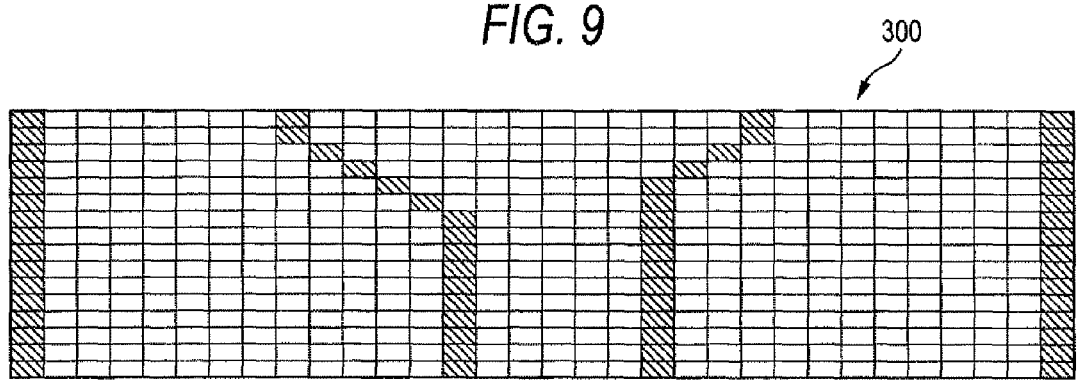
FIG. 9 is an explanatory view showing an example of the shortest path in the case of convergence.

With an upward direction as a start direction, an example of the shortest path obtained by two round-trips is shown in FIG. 7, an example of the shortest path obtained by three round-trips is shown in FIG. 8, and an example of the shortest path obtained under a state where any change of the start and end points of the paths is made to disappear by the round-trips is shown in FIG. 9. As used herein, the state where any change of the start and end points of the paths disappears refers to agreement of the upward paths and the downward paths. The agreement refers to the coincidence of paths irrespective of their directions. It means that a start point of one side may be an end point of the other side and an end point of one side may be a start point of the other side.

Figure 10:
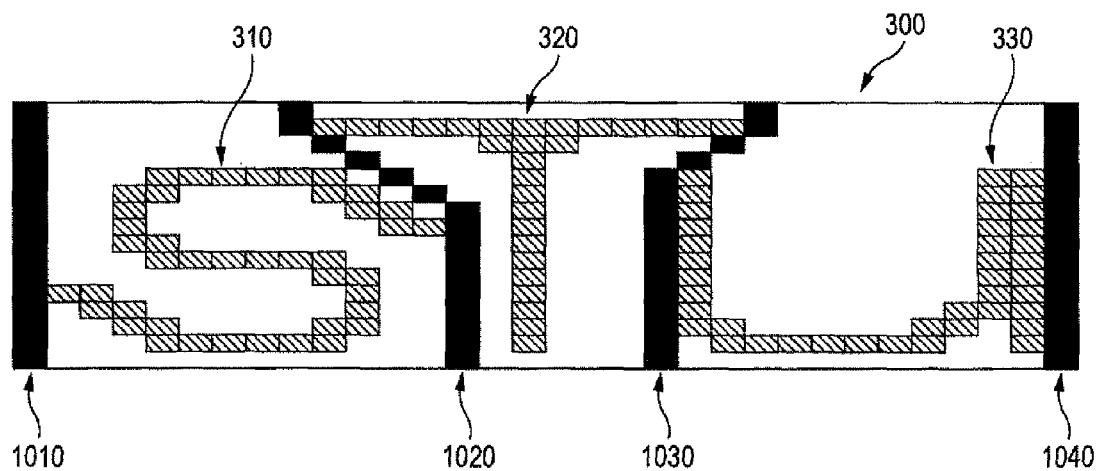
FIG. 10 is an explanatory view showing an example where an image is separated into areas by the shortest path.

In addition, with the shortest path illustrated in FIG. 9 as a separation path, the separation of image illustrated in FIG. 3 is schematically shown in FIG. 10 by way of example. That is, it may be seen from this figure that the image 300 is separated into areas of a character image 310 (character "S"), a character image 320 (character "T") and a character image 330 (character "U") by a separation path 1010, a separation path 1020, a separation path 1030 and a separation path 1040.

In this manner, the present exemplary embodiment addresses the narrowing down of separation paths based on the path convergence.

In addition, in the present exemplary embodiment, the round-trip process uses a set of pairs of a start point and an end point of the paths in order to eliminate a need to store positions or the like of pixels lying between the start points and the end points of the paths, which may result in a reduction of the amount of data to be processed. Paths completely converged as shown in the example of FIG. 9 may be calculated using only the set of pairs of start points and end points of the paths without positions and so on of pixels therebetween.

The calculation of paths to designate the number of round-trips (that is, calculation that does not necessarily provide the full convergence) may be performed such that the entire present exemplary embodiment adjusts a degree of separation for the number of round-trips according to a request using the fact that the number of separation paths is monotone decreasing.

Hereinafter, various exemplary embodiments which are suitable for implementation of the present invention will be described with reference to the drawings.

<Example of Basic Configuration of the Present Exemplary Embodiment>

Figure 11:
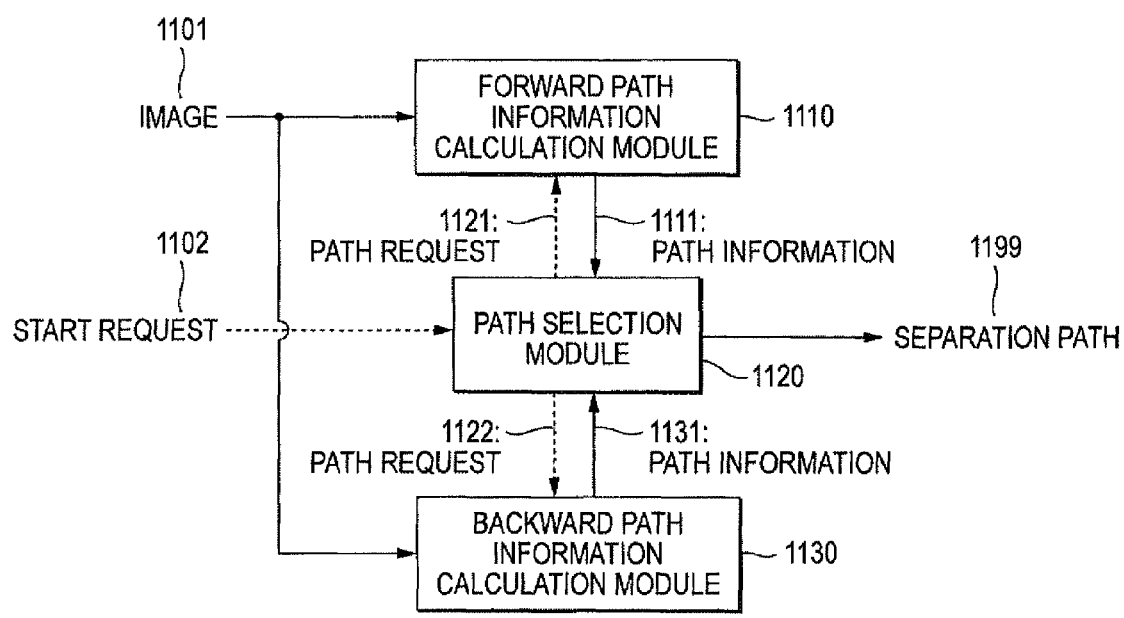
FIG. 11 is a conceptual module configuration view of an example of a basic configuration of the present exemplary embodiment.

First, FIG. 11 shows a conceptual module configuration view of an example of a basic configuration of the present exemplary embodiment (path extraction apparatus which is an image processing apparatus). This example of basic configuration performs the following processes.

(1) Path information calculation process: Process to interpret a target image and calculate path information upon receiving a path request. This process includes two kinds as follows.

(a) Forward path information calculation (process by a forward path information calculation module 1110)

(b) Backward path information calculation (process by a backward path information calculation module 1130)

(2) Path selection (Process by a path selection module 1120): Process to select a path based on path convergence by referring to path information.

(1) The path information calculation process is performed by the forward path information calculation module 1110 and the backward path information calculation module 1130. The forward path information calculation module 1110 and the backward path information calculation module 1130 are connected to the path selection module 1120 and perform a process to interpret an image 1101 and calculate information of the above-mentioned shortest path (path information 1111 and 1131). As used herein, the "forward" means a direction of an output path and the "backward" means the reverse of the forward. For example, paths shown in the example of FIG. 9 have an upward direction as a forward direction and a downward direction as a backward.

(2) The path selection is performed by the path selection module 1120. The path selection module 1120 is connected to the forward path information calculation module 1110 and the backward path information calculation module 1130 and obtains forward and backward path information (path information 1111 and 1131) output by the forward path information calculation module 1110 and the backward path information calculation module 1130. In addition, the path selection module 1120 selects a path based on the obtained path information using path convergence and outputs a separation path 1199.

In the example of FIG. 11, information indicated by dashed lines (start request 1102, path request 1121 and path request 1122) indicates processes which are not necessarily presented. Specifically, the start request is information to designating the number of round-trips, initial direction and initial start point of the path selection. The path request is information designating a start point of a path to allow the forward path information calculation module 1110 and the backward path information calculation module 1130 to calculate path information.

As used herein, the term "module" refers generally to a component such as locally-dividable software (computer program), hardware or the like. Accordingly, the modules employed in the present exemplary embodiment include both of computer program modules and hardware modules. Therefore, the present exemplary embodiment includes description about a computer program, a system and a method. For the purpose of convenience of description, as used herein, the term "store," "being stored" or derivatives thereof means that, when an exemplary embodiment is a computer program, it stores data and the like in a storing device or controls data or the like to be stored in the storing device. Although modules may have one-to-one correspondence to functionalities, for practical use, one module may be configured by one program, a plurality of modules may be configured by one program, or one module may be configured by a plurality of programs. A plurality of modules may be executed by one computer, or one module may be executed by a plurality of computers in distributed or parallel environments. In addition, one module may include other modules. As used herein, the term "connection" may include not only physical connection but also logical connection (data exchange, instruction, reference relationship between data, etc.).

As used herein, the term "system" or "apparatus" may include a plurality of computers, hardware, apparatuses and the like which are interconnected by communication means such as a network (including a one-to-one correspondence communication connection) or the like as well as a single computer, a single hardware, a single apparatus and the like. The "apparatus" and the "system" are herein used to be synonymous. Of course, the "system" does not include only social "structures" (social systems) which are artificial engagements. As used herein, the phase "predetermined" may include not only that determined before a targeted process but also that determined according to situations/conditions at that time or up to now before start of a process by the present exemplary embodiment as well as before a targeted process even after start of a process by the present exemplary embodiment.

In addition, when each module performs each process or a plurality of processes, targeted information is read from a storing device and is subjected to such process or processes, and then results of such process or processes are written into the storing device. Accordingly, in some cases, explanation about reading-in from the storing device before process and writing into the storing device after process may be omitted. As used herein, the term "storing device" may include a hard disk, RAM (Random Access Memory), an external storage medium, a storing device through a communication circuit, a register within a CPU (Central Processing Unit), etc.

In the following description, a target image is mainly illustrated with an image having a plurality of characters of a one-line horizontal writing.

<Classification of Exemplary Embodiments>

Hereinafter, examples of exemplary embodiments are classified according to the following items.

(1) The number of round-trips
(2) Timing of calculation of path information
(3) Narrowing-out information
(4) Adjustment of narrowing-out That is, this classification is as shown in Table 1 by way of example.

TABLE 1

| Number of round-trips | Timing of calculation path information | Narrowing-out information | Adjustment of narrowing-out | Exemplary embodiment |
|---|---|---|---|---|
| One | — | — | — | First exemplary embodiment |
| Two or more | Lumped calculation | Path | Designation of the number of round-trips | Second exemplary embodiment |
| | | | Full convergence | Second exemplary embodiment |
| | | Start point | Designation of the number of round-trips | Third exemplary embodiment |
| | | | Full convergence | Third exemplary embodiment |
| | Sequential calculation | Path | Designation of the number of round-trips | Fourth exemplary embodiment |
| | | Start point | Designation of the number of round-trips | Fifth exemplary embodiment |

(1) The number of round-trips is a classification depending on the number of times by which the above-mentioned round-trip is performed. For number of times by which the round-trip is performed, the number of separation paths is monotone decreasing. A first exemplary embodiment involves one round-trip (one time for each of forward and backward) and other exemplary embodiments involve two or more round-trips.

(2) The timing of calculation path information is a classification depending on whether or not all the path information is calculated in advance (hereinafter referred to as "lumped calculation") or whether or not required path information is calculated in sequence (hereinafter referred to as "sequential calculation"). This is involved with a trade-off between a work memory and processing time. Second and third exemplary embodiments involve the lumped calculation and fourth and fifth exemplary embodiments involve the sequential calculation.

(3) The narrowing-out information is a classification depending on whether paths themselves (positions of pixels on paths between start points and end points in addition to positions of the start points and the end points) are referenced or start points (or pairs of start points and end points) are referenced when paths are narrowed out using convergence of the shortest path. For practical use, the latter is mainly selected from a point of view of work memory and processing time. The second exemplary embodiment and the fourth exemplary embodiment are to reference paths themselves and the third exemplary embodiment and the fifth exemplary embodiment are to reference start points.

(4) Adjustment of narrowing-out is a classification depending on whether a result of narrowing-out by the predetermined number of round-trips is taken as a separation path or a result of full convergence is taken as a separation path. Both are different in their processes. In cases where path information is calculated in advance in a lump (the second exemplary embodiment and the third exemplary embodiment), an example where the result of full convergence is taken as a separation path is shown. In addition, although there may be an exemplary embodiment of obtaining a result of full convergence by sequential calculation, this exemplary embodiment will not be shown since this is to add a termination condition with an infinite number of round-trips and is equivalent to designating a number of round-trips.

<First Exemplary Embodiment>

Figure 12:
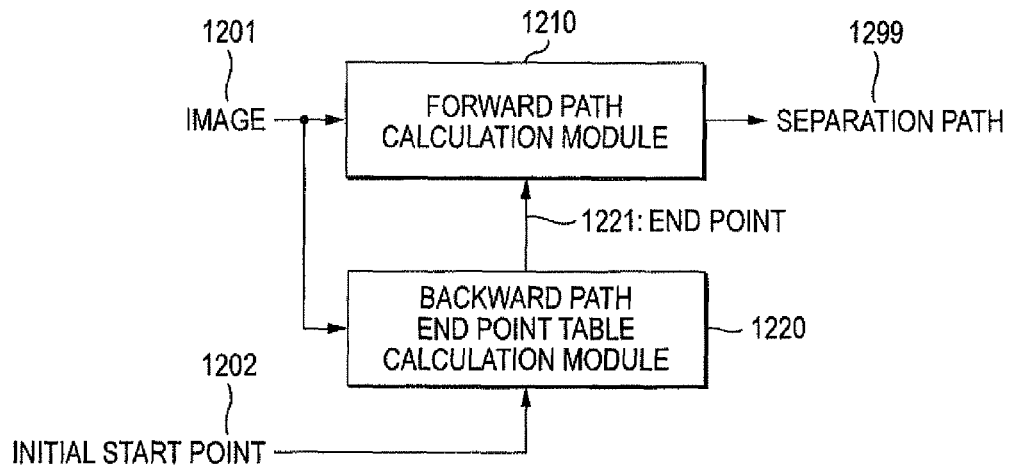
FIG. 12 is a conceptual module configuration view of an example of a configuration of a first exemplary embodiment.

FIG. 12 is a conceptual module configuration view of an example of a configuration of a first exemplary embodiment. An example of the first exemplary embodiment involves narrowing out paths through one round-trip and includes a forward path calculation module 1210 and a backward path end point calculation module 1220 which are connected to each other.

The first exemplary embodiment performs the following process.

<<Step 1.>>

The backward path end point calculation module 1220 receives an image 1201 and an initial start point 1202, calculates an end point 1221 of the shortest path corresponding to the initial start point 1202 by interpreting the image 1201, and outputs the calculated end point 1221 to the forward path calculation module 1210.

<<Step 2.>>

The forward path calculation module 1210 takes the received end point 1221 as a start point, and then, calculates and outputs a separation path 1299 corresponding to the start point by interpreting the image 1201, and is then terminated.

In addition, the forward path calculation module 1210 may perform the role of the path selection module 1120 shown in the example of FIG. 11.

<Second Exemplary Embodiment>

Second and subsequent exemplary embodiments involve narrowing out paths through two or more round-trips.

Figure 13:
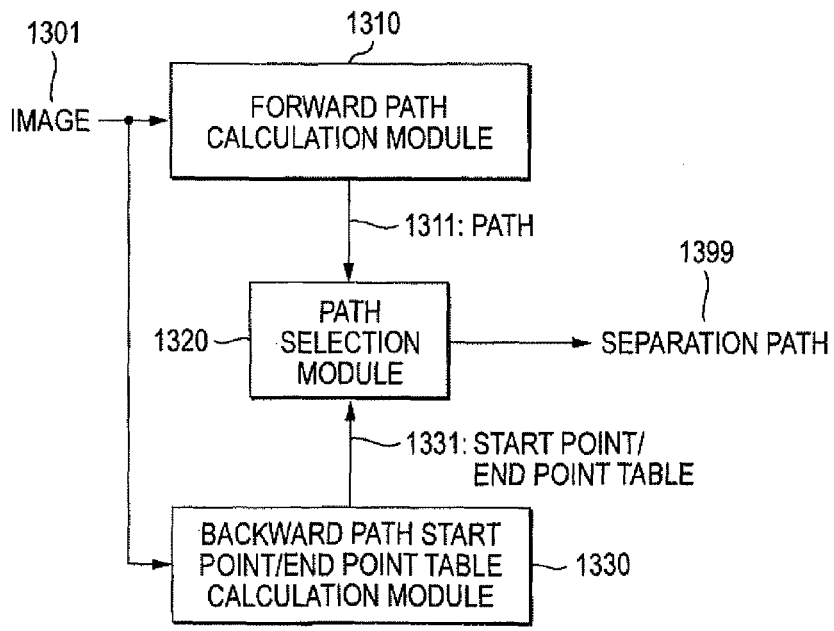
FIG. 13 is a conceptual module configuration view of an example of a configuration of a second exemplary embodiment.

FIG. 13 is a conceptual module configuration view of an example of a configuration of the second exemplary embodiment. An example of the second exemplary embodiment involves calculating path information in advance in a lump and narrowing out the calculated path information and includes a forward path calculation module 1310, a path selection module 1320 and a backward path start point/end point table calculation module 1330. In particular, a case where information of all the paths is calculated in advance in a lump and is then narrowed out will be described. As used herein, the term "all the paths" refers to all the paths with all the pixels in the top and bottom of a target image as start points.

The second and third exemplary embodiments are used to achieve a reduction of the processing time since they involve calculating path information only once at first.

The second exemplary embodiment performs the following process.

<<Step 1.>>

The backward path start point/end point table calculation module 1330 is connected to the path selection module 1320, calculates a start point/end point table 1331 by interpreting an image 1301, and outputs the calculated table 1331 to the path selection module 1320.

The forward path calculation module 1310 is connected to the path selection module 1320, calculates paths 1311 of all start points by interpreting the image 1301, and outputs the calculated paths 1311 to the path selection module 1320.

<<Step 2.>>

The path selection module 1320 is connected to the forward path calculation module 1310 and the backward path start point/end point table calculation module 1330, narrows out paths based on the forward paths 1311 and the backward start point/end point table 1331, outputs the narrowed-out paths as a separation path 1399, and is then terminated.

The start point/end point table will be described later.

<Third Exemplary Embodiment>

Figure 14:
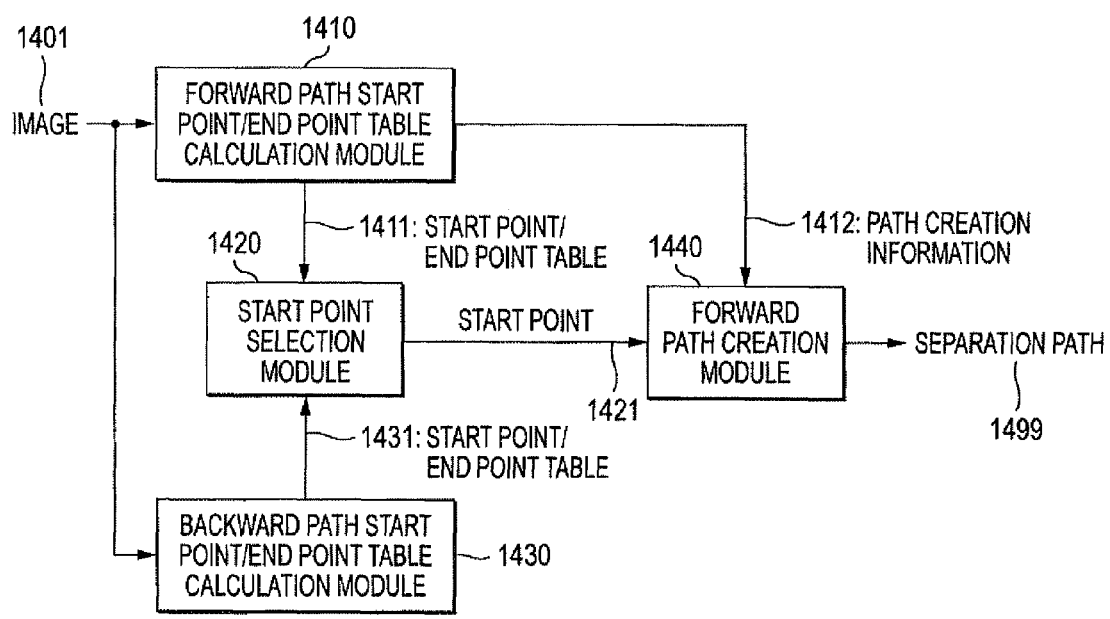
FIG. 14 is a conceptual module configuration view of an example of a configuration of a third exemplary embodiment.

FIG. 14 is a conceptual module configuration view of an example of a configuration of the third exemplary embodiment. An example of the third exemplary embodiment involves calculating only a start point/end point table and path creation information and calculating a path after narrowing out start points and includes a forward path start point/end point table calculation module 1410, a start point selection module 1420, a backward path start point/end point table calculation module 1430 and a forward path creation module 1440.

The third exemplary embodiment performs the following process.

<<Step 1.>>

The backward path start point/end point table calculation module 1430 is connected to the start selection module 1420, calculates a start point/end point table 1431 by interpreting an image 1401, and outputs the calculated table 1431 to the start point selection module 1420.

The forward path start point/end point table calculation module 1410 is connected to the start point selection module 1420 and the forward path creation module 1440, calculates a start point/end point table 1411 by interpreting the image 1401, and outputs the calculated table 1411 to the start point selection module 1420. In addition, this module 1410 calculates path creation information 1412 and outputs the calculated path creation information 1412 to the forward path creation module 1440.

<<Step 2.>>

The start point selection module 1420 is connected to the forward path start point/end point table calculation module 1410, the backward path start point/end point table calculation module 1430 and the forward path creation module 1440 and narrows out start points 1421 of paths based on the forward path start point/end point 1411 and the backward path start point/end point table 1431, outputs the narrowed-out start points to the forward path creation module 1440.

<<Step 3.>>

The forward path creation module 1440 is connected to the forward path start point/end point table calculation module 1410 and the start point selection module 1420, creates paths of the start points 1421 received from the start point selection module 1420 based on the path creation information 1412 received from the forward path start point/end point table calculation module 1410, and outputs the created paths as a separation path 1499.

Here, the start point/end point table will be described.

A start point/end point table refers to information keeping a pair of a start point and an end point of a path. Such information of a pair of a start point and an end point of a path is used for a narrowing-out process of the paths in the second exemplary embodiment (FIG. 13) and the third exemplary embodiment (FIG. 14). Hereinafter, this process will be described.

For the present, a forward start point/end point table is expressed by the following Equation 1.

$$T=(e_0, e_1, \ldots, e_{w-1})$$ [Equation 1]

A backward start point/end point table is expressed by T'. The following Equation 2 represents an end point position with a position x as a start point.

$$T(x)=e_x$$ [Equation 2]

The start point/end point table is an arrangement of pairs of start points and end points of paths of all the start points and w is a horizontal width of a target image (width in a character string direction).

The path selection module 1320 in the second exemplary embodiment (FIG. 13) calculates T from the received path 1311 and performs the same process as below.

A path is expressed by the following Equation 3.

$$p=(x_0, x_1, \ldots, x_{h-1})$$ [Equation 3]

A position of a path at a height y is expressed by the following Equation 4.

$$p(y)=x_y$$ [Equation 4]

For example, a start point and an end point of an upward path are expressed by the following Equations 5 and 6, respectively.

$$p(0)=x_0$$ [Equation 5]

$$P(h-1)=x_{h-1}$$ [Equation 6]

Where, h is a vertical width of a target image (width in a direction perpendicular to the character string direction). If forward is upward, by expressing a set of paths 1311 received by the path selection module 1320 as the following Equation 7 and setting the following Equation 9 for all of the following Equation 8, T is calculated from the received paths. If forward is downward, the following Equation 10 is set.

$$P'\{p_0, p_1, \ldots, p_{w-1}\}$$ [Equation 7]

$$p \in P$$ [Equation 8]

$$T(p(0)) \leftarrow p(h-1)$$ [Equation 9]

$$T(p(h-1)) \leftarrow p(0)$$ [Equation 10]

A direction of the start point/end point table referenced first (referred to an "initial direction") is defined by the forward direction, which is a direction of a path to be output, and the number of round-trips. Specifically, if the number of round-trips is an odd number, the initial direction is backward, and if the number of round-trips is an even number, the initial direction is forward.

For a path narrowing-out process, the narrowing-out of paths to designate the number of round-trips is different from the narrowing-out of paths by full convergence. These narrowing-out processes will be described below.

First, the narrowing-out process of paths (start points) to designate the number of round-trips is performed according to the following Equation 11.

Step 1. The number of round-trips is set to R.
If R is an even number, $T_{tmp} \leftarrow T$,
otherwise, $T_{tmp} \leftarrow T'$.
Step 2. A set of start points is set to S.

$$S_{tmp} \leftarrow \{T_{tmp}(x) | x \in S\}$$

$$S \leftarrow S_{tmp}$$ [Equation 11]

Step 3. If R=1, S is output and the process is terminated, otherwise, $R \leftarrow R-1$
Step 4. If $T_{tmp}=T'$, $T_{tmp} \leftarrow T$,
otherwise, $T_{tmp} \leftarrow T'$, and
return to Step 2.

Next, the narrowing-out process of paths (start points) by full convergence is performed according to the following Equation 12.

Step 1. A set of start points is set to S.
For x=[0, w−1], $$S \leftarrow \{x | T(T(x))=x\}$$ [Equation 12]

S is output and the process is terminated.

In this manner, the set of start points S is obtained. The path selection module 1320 in the second exemplary embodiment (FIG. 13) outputs P' as the following Equation 13 after processing the above Equation 12.

$$P' \leftarrow \{p | p(y)=s, p \in P, s \in S\}$$ [Equation 13]

If forward is upward, y=0, and if forward is downward, y=h−1.

In cases where an end point (B) for a start point (A) in one direction is taken as a start point (B) in the other direction, the equation of the third line in the above Equation 12 indicates that an end point of the resultant path becomes (A).

<Fourth Exemplary Embodiment>

The fourth exemplary embodiment (FIG. 15) and the fifth exemplary embodiment (FIG. 16) involve calculating sequential and required path information in the process of narrowing-out paths by two or more round-trips. The fourth exemplary embodiment is configured to calculate sequential paths and the fifth exemplary embodiment is configured to calculate sequential start points and then calculate paths.

The configuration shown in the fourth and fifth exemplary embodiments is used to achieve reduction of a work memory in calculating the sequential and required path information.

The fourth exemplary embodiment includes a forward path calculation module 1510, a sequential path selection module 1520 and a backward path end point calculation module 1530.

Figure 15:
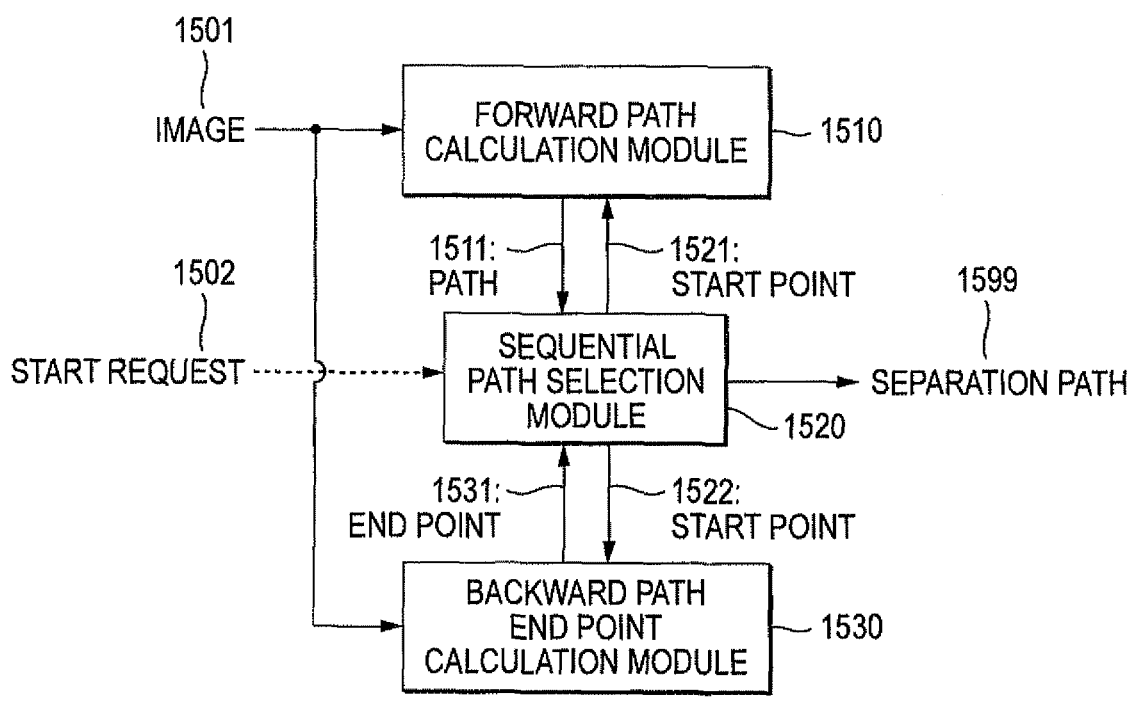
FIG. 15 is a conceptual module configuration view of an example of a configuration of a fourth exemplary embodiment.

A start request (1502 shown in the example of FIGS. 15 and 1602 shown in the example of FIG. 16) is a set of initial start points.

The fourth exemplary embodiment performs the following process.

<<Step 1.>>

The number of round-trips is set to R.

The sequential path selection module 1520 is connected to the forward path calculation module 1510 and the backward path end point calculation module 1530 and performs the following process.

If R is an even number, start points 1521 are output to the forward path calculation module 1510 and the process proceeds to Step 2.

Otherwise, with R←R−1, start points 1522 are output to the backward path end point calculation module 1530 and the process proceeds to Step 4.

<<Step 2.>>

The forward path calculation module 1510 is connected to the sequential path selection module 1520, calculates paths 1511 of all the received start points 1521 by interpreting an image 1501, and outputs the calculated paths 1511 to the sequential path selection module 1520.

<<Step 3.>>

If R=0, the sequential path selection module 1520 outputs the received paths 1511 as a separation path 1599 and the process is terminated.

Otherwise, with R←R−2 and with start points of the received paths 1511 as end points, the start points 1522 are output to the backward path end point calculation module 1530.

<<Step 4.>>

The backward path end point calculation module 1530 is connected to the sequential path selection module 1520, calculates end points 1531 of paths of all the received start points 1522 by interpreting the image 1501, and outputs the calculated end points 1531 to the sequential path selection module 1520.

<<Step 5.>>

With the received end points 1531 as start points, the sequential path selection module 1520 outputs the end points 1531 to the forward path calculation module 1510 and the process proceeds to Step 2.

<Fifth Exemplary Embodiment>

Figure 16:
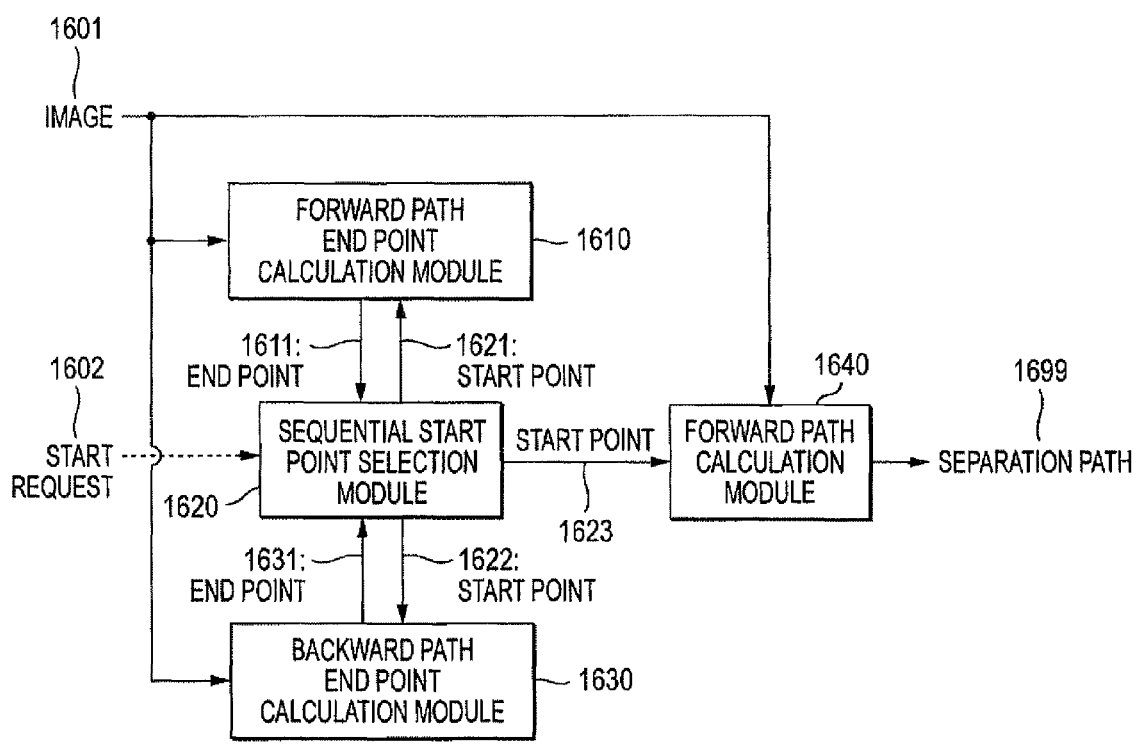
FIG. 16 is a conceptual module configuration view of an example of a configuration of a fifth exemplary embodiment.

FIG. 16 is a conceptual module configuration view of an example of a configuration of a fifth exemplary embodiment. The fifth exemplary embodiment includes a forward path end point calculation module 1610, a sequential start point selection module 1620, a backward path end point calculation module 1630 and a forward path calculation module 1640.

The fifth exemplary embodiment performs the following process.

<<Step 1.>>

The number of round-trips is set to R.

The sequential start point selection module 1620 is connected to the forward path end point calculation module 1610, the backward path end point calculation module 1630 and the forward path calculation module 1640 and performs the following process.

If R is an even number, start points 1621 are output to the forward path end point calculation module 1610 and the process proceeds to Step 2.

Otherwise, with R←R−1, start points 1622 are output to the backward path end point calculation module 1630 and the process proceeds to Step 4.

<<Step 2.>>

The forward path end point calculation module 1610 is connected to the sequential start point selection module 1620, calculates end points 1611 of paths of all the received start points 1621 by interpreting an image 1601, and outputs the calculated end points 1611 to the sequential start point selection module 1620.

<<Step 3.>>

If R=0, with the received end points 1611 as start points 1623, the sequential start point selection module 1620 outputs the end points 1611 to the forward path calculation module 1640 and the process proceeds to Step 6.

Otherwise, with R←R−2 and with the received end points 1611 of paths as start points, the start points 1622 are output to the backward path end point calculation module 1630.

<<Step 4.>>

The backward path end point calculation module 1630 is connected to the sequential start point selection module 1620, calculates end points 1631 of paths of all the received start points 1622 by interpreting the image 1601, and outputs the calculated end points 1631 to the sequential start point selection module 1620.

<<Step 5.>>

With the received end points 1631 as start points 1621, the sequential start point selection module 1620 outputs the end points 1631 to the forward path end point calculation module 1610 and the process proceeds to Step 2.

<<Step 6.>>

The forward path calculation module 1640 is connected to the sequential start point selection module 1620, creates paths of all the received start points 1623, outputs the created paths as a separation path 1699, and the process is terminated.

<Exemplary Embodiments for Outputting a Partial Image>

Configurations of separating an image by the separation path calculated according to the above-described exemplary embodiments are shown in FIGS. 17, 18, 19 and 20. These configurations are configurations to separate mono-characters from a character string image and output the separated mono-characters as a mono-character image. In FIGS. 17, 18, 19 and 20, a path extraction module refers to a configuration of any of the first exemplary embodiment (FIG. 12), the second exemplary embodiment (FIG. 13), the third exemplary embodiment (FIG. 14), the fourth exemplary embodiment (FIG. 15) and the fifth exemplary embodiment (FIG. 16). The output mono-character image is processed by, for example, a character image recognizing device or the like.

Figure 17:
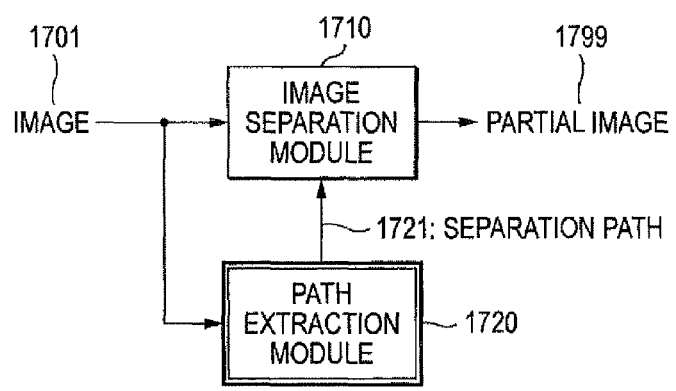
FIG. 17 is a conceptual module configuration view of an example of a configuration of an image processing apparatus equipped with a path extraction module.

FIG. 17 is a conceptual module configuration view of an example of a configuration of an image processing apparatus equipped with a path extraction module 1720. This exemplary embodiment involves separating an image by a separation path and outputting a partial image and includes an image separation module 1710 and a path extraction module 1720.

The image separation module 1710 is connected to the path extraction module 1720, receives an image 1701 which is a character string image, separates the image 1701 into areas of mono-character images according to a separation path 1721 received from the path extraction module 1720, and outputs the areas of mono-character images as a partial image 1799.

Figure 18:
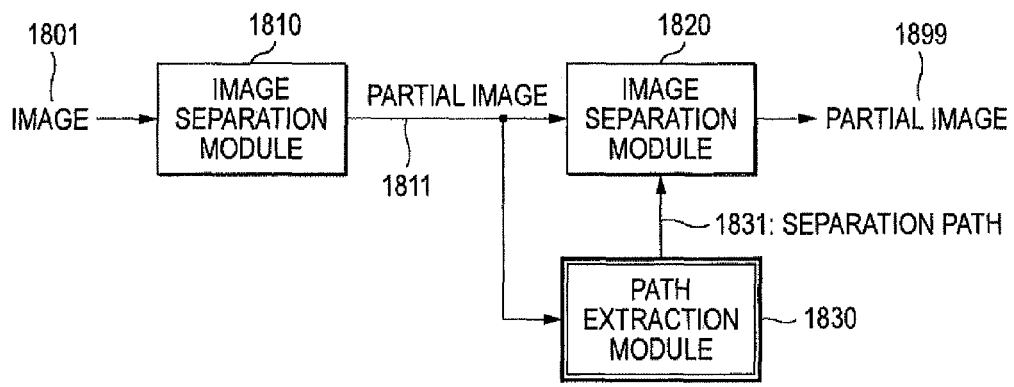
FIG. 18 is a conceptual module configuration view of an example of a configuration of an image processing apparatus equipped with a path extraction module.

FIG. 18 is a conceptual module configuration view of an example of a configuration of an image processing apparatus equipped with a path extraction module 1830. This exemplary embodiment includes an image separation module 1810, an image separation module 1820 and a path extraction module 1830.

The image separation module 1810 is connected to the image separation module 1820 and the path extraction module 1830 and extracts separation candidate areas as a pre-process of the path extraction module 1830. For example, this module 1810 extracts only character images, as a partial image 1811, from the image 1801. In addition, this module 1810 separates a mono-character image separable by a conventional technique using projection information or the like and provides an inseparable mono-character image (partial image 1811) to the path extraction module 1830.

The image separation module 1820 is connected to the image separation module 1810 and the path extraction module 1830, separates the partial image 1811 received from the image separation module 1810 into areas of mono-character images according to a separation path 1831 received from the path extraction module 1830, and outputs the areas of mono-character images as a partial image 1899. In addition, when the image separation module 1810 separates a mono-character image, the partial image 1811 provided from the image separation module 1810 to the image separation module 1820 includes mono-character images of areas separated by the image separation module 1810 (images other than the image to be processed by the path extraction module 1830), which are output unchanged as the partial image 1899.

Figure 19:
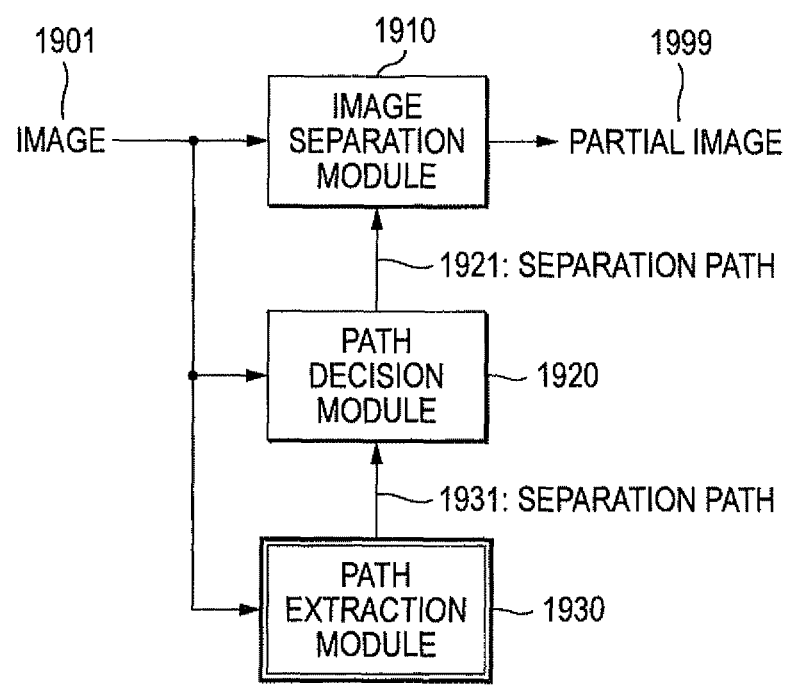
FIG. 19 is a conceptual module configuration view of an example of a configuration of an image processing apparatus equipped with a path extraction module.

FIG. 19 is a conceptual module configuration view of an example of a configuration of an image processing apparatus equipped with a path extraction module 1930. This exemplary embodiment includes an image separation module 1910, a path decision module 1920 and a path extraction module 1930.

The path decision module 1920 is connected to the image separation module 1910 and the path extraction module 1930 and decides whether or not a correct separation may be made by a separation path 1931 output from the path extraction module 1930. This is to reject a meaningless separation path such as when an appearance interval between a plurality of separation paths is narrower than an appearance interval between other separation paths (for example, radicals (left sides), right sides or the like of Chinese characters). An image 1901 may be used for the decision.

The image separation module 1910 is connected to the path decision module 1920, separates the image 1901 into areas of mono-character images according to a separation path 1921 received from the path decision module 1920, and outputs the areas of mono-character images as a partial image 1999.

Figure 20:
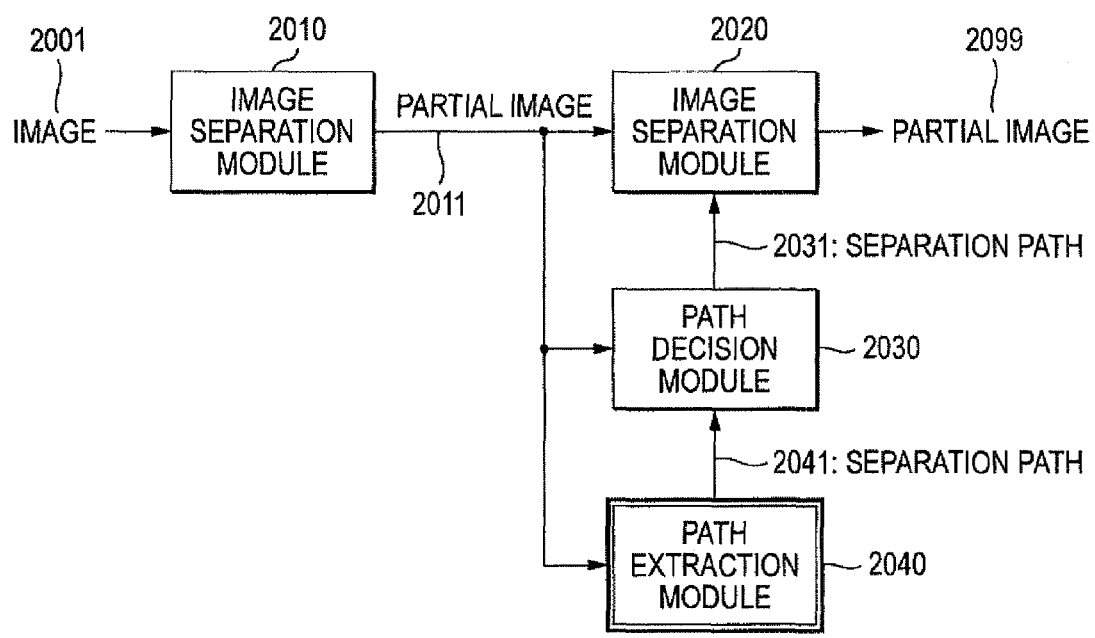
FIG. 20 is a conceptual module configuration view of an example of a configuration of an image processing apparatus equipped with a path extraction module.

FIG. 20 is a conceptual module configuration view of an example of a configuration of an image processing apparatus equipped with a path extraction module 2040. This exemplary embodiment includes an image separation module 2010, an image separation module 2020, a path decision module 2030 and a path extraction module 2040. This is a combination of both examples of FIGS. 18 and 19.

The image separation module 2010 is connected to the image separation module 2020, the path decision module 2030 and the path extraction module 2040 and performs the same process as the image separation module 1810 shown in the example of FIG. 18.

The path decision module 2030 is connected to the image separation module 2010, the image separation module 2020 and the path extraction module 2040 and performs the same process as the path decision module 1920 shown in the example of FIG. 19.

The image separation module 2020 is connected to the image separation module 2010 and the path decision module 2030 and performs the same process as the image separation module 1910 shown in the example of FIG. 19 except that a target image is a partial image 2011 received from the image separation module 2010.

EXAMPLES

Hereinafter, examples of the processes of calculating paths in the above-described exemplary embodiments (for example, the processes performed by the forward path calculation module 1210, the backward path end point calculation module 1220 and so on in the first exemplary embodiment (FIG. 12)) will be described in detail.

Figure 21:
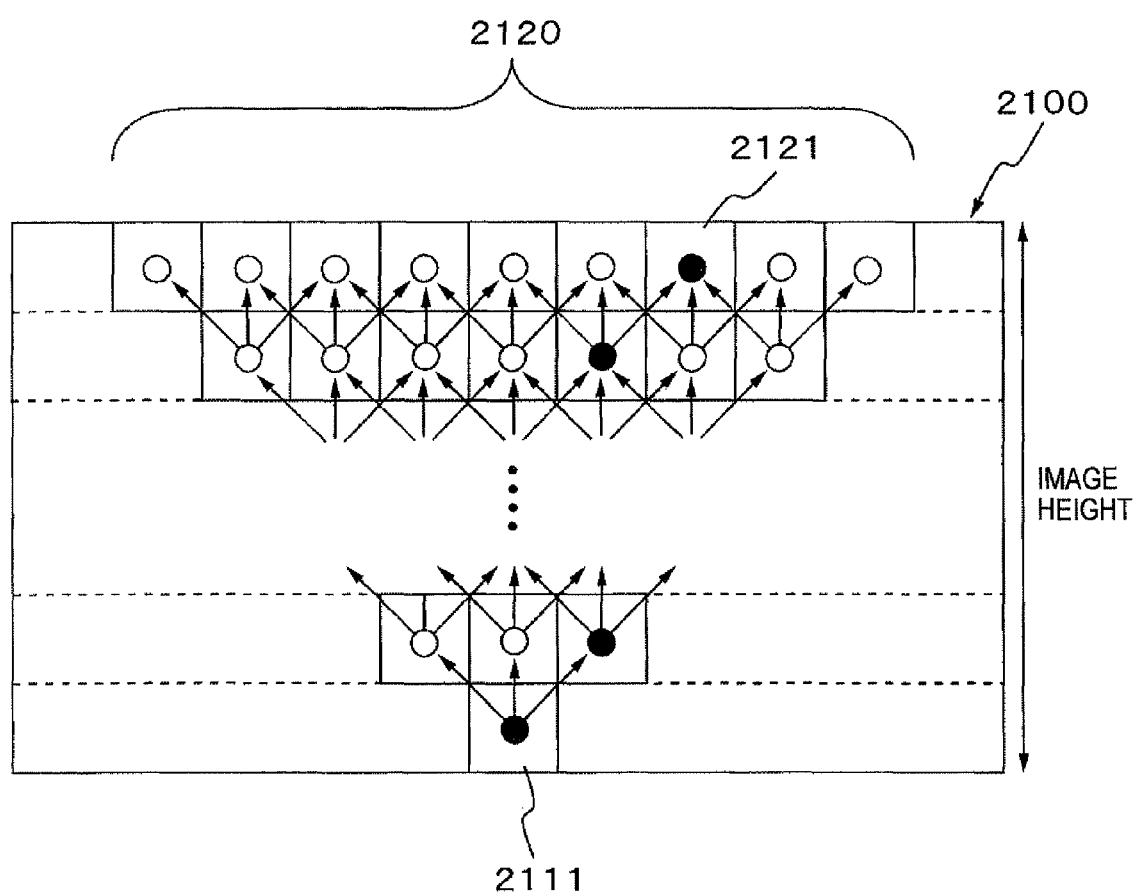
FIG. 21 is an explanatory view showing an example of calculation of path information.

An example of calculating information on a plurality of shortest paths having different start points for the shortest path shown in the example of FIG. 1 using the shortest path shown in the example of FIG. 21 is presented. A shortest path calculation method may include, for example, the Dijkstra method and other methods.

The shortest path shown in the example of FIG. 21 will be described below.

This example is targeted at a tree structure with a certain pixel as a parent pixel and with three pixels including pixels adjacent to the parent pixel in an end point direction (upward direction in FIG. 21) and pixels existing at an inclination of 45 degrees to the end point direction as child pixels. With this structure repeated, as shown in the example of FIG. 21, a tree whose height corresponds to an image height is extracted with a certain pixel (start point 2111) of one end portion of an image 2100 as a root and with pixels (end point 2121 and so on) of other end portion as leaves.

The shortest path in the present exemplary embodiment refers to a path having the minimum or maximum of a cost which is an accumulative value of luminescence values of pixels (that is, nodes) on any of all the paths leading from the root to the leaves for the above-described tree. The root corresponds to a start point and the leaves correspond to end points.

Figure 22:
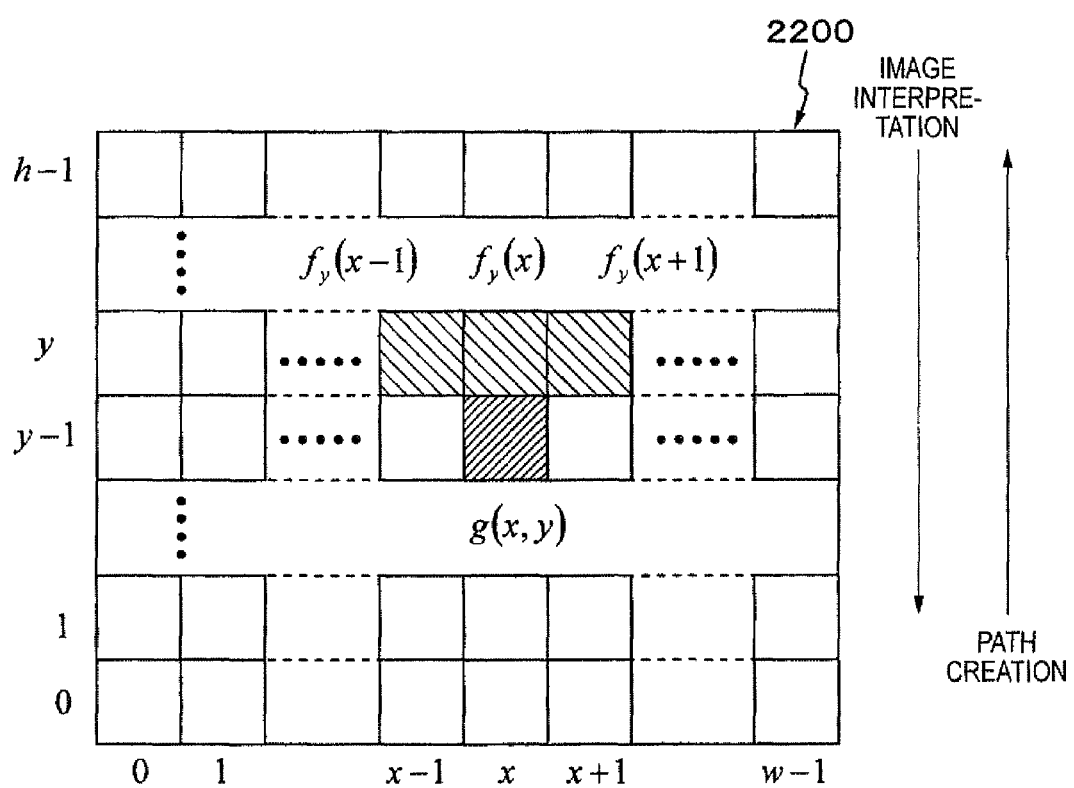
FIG. 22 is an explanatory view showing an example of calculation of path information.

First, an example of a calculation process for a basic shortest path is shown in an algorithm of the following Equation 14. For reference, a position relationship between process targets is shown in the example of FIG. 22.

This example is a backward inductive process and a search method of the shortest path of the tree shown in the example of FIG. 21. However, a path cost lies not in the side but in the nodes. It should be noted that <Step 2. Image interpretation> and <Step 3. Path creation> are reversed in the order of processes for positions on an image. It is apparent that this process is applicable to all directions including a downward direction although it is a process for calculating the upward shortest path.

In addition, this process corresponds to "forward path calculation."<Step 3.> and its subsequence correspond to "forward path creation."

[Equation 14]
Step 1. Initialization
For x=[0, w−1], $$f_{h-1}(x) \leftarrow g(x, h-1).$$

Step 2. Image interpretation
Step 2-1. y←h−1
Step 2-2. For x=[0, w−1], $$f_{y-1}(x) \leftarrow c_i \times g(x, y-1) + f_y(x+i)$$

$$\phi_{y-1}(x) \leftarrow i.$$

Where, i satisfies $$f_y(x+i) = \min_{-1 \le j \le 1} (f_y(x+j))$$

Step 2-3. y←y−1
Step 2-4. If y=0, go to Step 3. Otherwise, go to Step 2-2.
Step 3. Path creation
For all x∈S,
Step 3-1. p(0)←x∈S
Step 3-2. y<←1
Step 3-3. p(y)←p(y−1)+φ$_y$(p(y−1))
Step 3-4. y←y+1
Step 3-5. If y=h, add p to P.
Otherwise, go to Step 3-3.
Step 4. Output P and terminate the process.

If only the end points of paths are to be output, p(h−1) may be referenced but <Step 3.> and its subsequence may be made similar to an algorithm of the following Equation 15 in order to omit a work memory. This process corresponds to "forward path end point calculation" and "backward path end point calculation." [Equation 15]

Step 3. Path end point calculation
For all x∈S,
Step 3-1. e←x∈S
Step 3-2. y←1
Step 3-3. e←e+$\phi_y$(e)
Step 3-4. y←y+1
Step 3-5. If y=h, add e to E.
Otherwise, go to Step 3-3.
Step 4. Output E and terminate the process.

Similarly, an algorithm of the following Equation 16 may be used to calculate a start point/end point table of paths. This process corresponds to "forward path start point/end point table calculation" and "backward path start point/end point table calculation."

[Equation 16]
Step 3. Path end point calculation
For all x∈S,
Step 3-1. e←x∈S
Step 3-2. y←1
Step 3-3. e←e+$\phi_y$(e)
Step 3-4. y←y+1
Step 3-5. If y=h, T(x)←e.
Otherwise, go to Step 3-3.
Step 4. Output T and terminate the process.

Here, the meaning of symbols is as shown in the following Equation 17.
[Equation 17]
w: image horizontal width
h: image vertical width
g(x,y): luminescence value of a pixel at position (x,y) on an input image
$f_y$(x): path cost information
$\phi_y$(x): path creation information
p(y): position x of path at height y
$c_i$: weighting constant for cost evaluation
S: set of start points
E: set of end points
P: set of paths
T(x): start point/end point table, end points of paths of start points of position x Attention should be given to the maintenance method of the following Equations 18 and 19 for the above-described processes.

$$f_y(x) \qquad \text{[Equation 18]}$$

$$\phi_y(x) \qquad \text{[Equation 19]}$$

That is, the number of numerical values maintained by Equations 18 and 19 may be smaller than an image size.

More specifically, Equation 18 represents information on path costs and indicates a line buffer. Only an immediately previous line need be referenced for the process and two line buffers may be sufficient for a maintenance part of Equation 18. In addition, although Equation 19 represents information on the movement of paths, an area having no path is sequentially identified. A maintenance area may be sequentially reduced by the area having no path.

Figure 23:
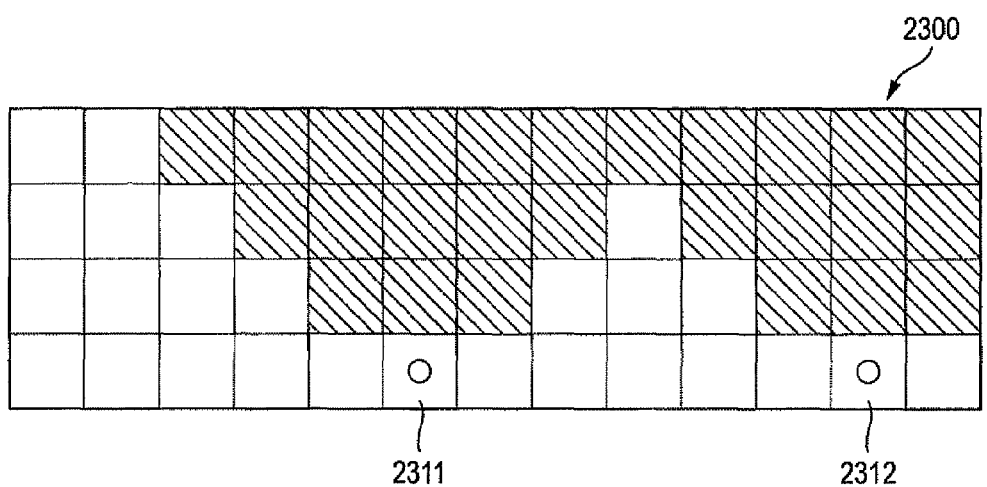
FIG. 23 is an explanatory view showing an example of information required to calculate path information.

In addition, if a start point is designated, as shown in the example of FIG. 23, information required to calculate the shortest path may be smaller than an image size and an area for maintaining Equations 18 and 19 may be further reduced in that the above-described tree structure is constructed. Furthermore, when a start point 2311 and a start point 2312 are employed in an image 2300, the example of FIG. 23 shows that colored pixels are pixels which are required to be referenced for interpretation and white pixels are pixels which need not necessarily be referenced for interpretation.

<Experiment Results>

Experiment results with the above-described exemplary embodiments will be described with reference to FIGS. 24, 25 and 26.

Figure 24:
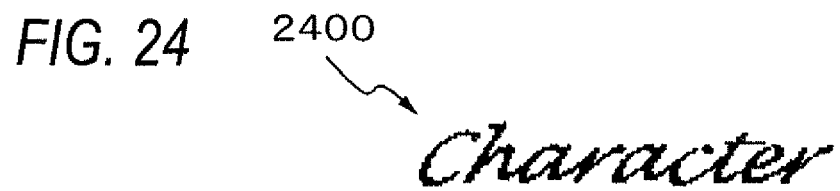
FIG. 24 is an explanatory view showing an example of a target image.

FIG. 24 is an explanatory view showing an example of a target image (a character image of "Character"). FIG. 25 is an explanatory view showing an example of the separation of an image targeted by the present exemplary embodiment. FIG. 26 is an explanatory view showing an example of projection information of a target image.

These examples will be described from the following three points of view.

(1) Even an area, which is a space between character images inseparable in projection information, may be separated.

Figure 26:
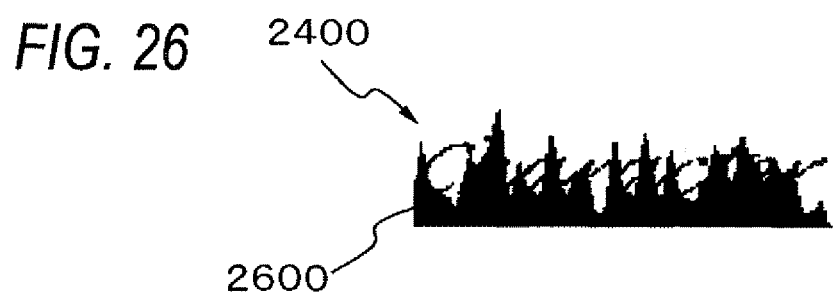
FIG. 26 is an explanatory view showing an example of projection information of a target image.

A character image portion of "ter" in the target image (see the example of FIG. 24) is a space between character images which are hard to separate in projection information 2600, as shown in the example of FIG. 26. That is, even when this character image portion is to be separated using projection information with conventional techniques, the character image portion is hard to separate because the projection information 2600 has no clear valley, as shown in the example of FIG. 26.

Figure 25:
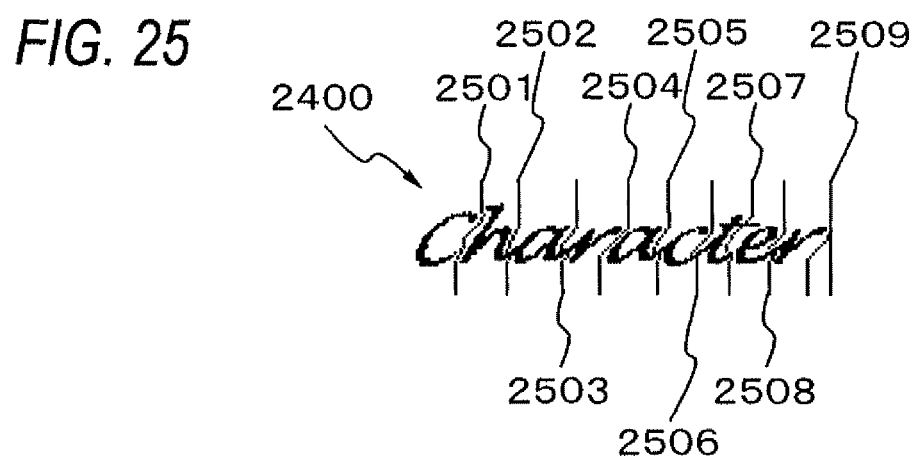
FIG. 25 is an explanatory view showing an example of separation of a target image.

For such an image, the present exemplary embodiment calculates a separation path having a shape such as passing around a character image, as shown in the example of FIG. 25.

(2) A connection component is separated.

For character image portions of "har," "act," and "er" in the target image (see the example of FIG. 24), there are portions connected to adjacent character images.

As shown in the example of FIG. 25, the present exemplary embodiment separates even connected character images. This is because a separation path having the minimum or maximum cost within a range by which the shortest path may be moved is calculated according to the above-described structure of image separation by the shortest path.

(3) There is a correspondence to a multi-level image.

An image 2400 shown in the example of FIG. 24 is a multi-level image. The processes according to the above-described exemplary embodiments correspond to a multi-level image including binary images. This eliminates a need to set a threshold for each input image, which is entailed in, for example, binarization.

An example of a hardware configuration of the image processing apparatus of the present exemplary embodiment will be described with reference to FIG. 27. The configuration shown in FIG. 27 is made by, for example, a personal computer (PC) or the like, showing an example of hardware configuration including a data reading part 2717 such as a scanner or the like and a data output part 2718 such as a printer or the like.

A CPU (Central Processing Unit) 2701 is a control part for executing a process according to a computer program describing an execution sequence of each module such as the various modules described in the above exemplary embodiments, that is, the forward path information calculation module 1110, the path selection module 1120, the backward path information calculation module 1130, the image separation module 1710 and so on.

A ROM (Read Only Memory) 2702 stores programs, operational parameters and so on used by the CPU 2701. A RAM (Random Access Memory) 2703 stores programs used in execution of the CPU 2701, parameters properly varied in the execution, and so on. These components are interconnected by a host bus 2704 including a CPU bus and so on.

The host bus 2704 is connected to an external bus 2706 such as a PCI (Peripheral Component Interconnect/Interface) bus through a bridge 2705.

A keyboard 2708 and a point device 2709 such as a mouse or the like are input devices operated by an operator. A display 2710 may be a liquid crystal display, a CRT (Cathode Ray Tube) or the like and display various information as text or image information.

A HDD (Hard Disk Drive) 2711 contains a hard disk and drives the hard disk to record or reproduce programs executed by the CPU 2701 or information. The hard disk stores target images, path information and so on. The hard disk also stores various computer programs such as other various data processing programs and so on.

A drive 2712 reads out data or programs recorded in a removable recording medium 2713 equipped therein such as a magnetic disk, an optical disk, a magneto-optic disk, a semiconductor memory or the like and provides the data or programs to the RAM 2703 connected through an interface 2707, the external bus 2706, the bridge 2705 and the host bus 2704. The removable recording medium 2713 may be also used as the same data recording area as the hard disk.

A connection port 2714 is a port connecting an external connection device 2715 and has a connection part such as a USB, an IEEE 1394 or the like. The connection port 2714 is connected to the CPU 2701 and so on through the interface 2707, the external bus 2706, the bridge 2705, the host bus 2704 and so on. A communication part 2716 is connected to a network and performs data communication with external parts. A data reading part 2717 is, for example, a scanner and performs a document reading process. A data output part 2718 is, for example, a printer and performs a document data output process.

The hardware configuration of the image processing apparatus shown in FIG. 27 is only by way of example; however, the present exemplary embodiment is not limited to the configuration shown in FIG. 27 but may employ other configurations as long as they are capable of executing the modules described in the present exemplary embodiment. For example, some of the modules may be configured by dedicated hardware (for example, ASIC (Application Specific Integrated Circuit) or the like), and some may be located within an external system and connected by a communication circuit, or plural systems shown in FIG. 27 may be interconnected by a communication circuit in cooperation with each other. The modules may be equipped within a copier, a facsimile machine, a scanner, a printer, a multifunctional machine (an image processing apparatus having two or more functions of scanner, printer, copier, facsimile machine and so on).

Although it has been illustrated in the above-described exemplary embodiments that an image of plural characters of a single line of horizontal writing is employed as a target image, the target image may be a character image of vertical writing. In this case, the terms "upward" and "downward" as used above correspond to a right direction and a left direction, respectively. In addition, this may be used to separate not only areas of a character image but also areas of images (for example, a figure image, a facial image or the like in a photograph) of other objects.

Although the above exemplary embodiments have been described using various equations, these equations may include equivalents thereof. The term "equivalent" may include modifications of equations so modified as to have no effect on a final result, solution of equations using an algorithmic solution, etc.

In addition, the above-described exemplary embodiments may be combined (for example, including exchanging a module in one exemplary embodiment with a module in a different exemplary embodiment, etc.) and the techniques described in the 'Background Art' may be employed as process contents of each module.

The programs described herein may be stored in a recording medium or may be provided through a communication means. In this case, for example, the described programs may be construed as the invention of "a computer readable recording medium having programs recorded thereon."

The "computer readable recording medium having programs recorded thereon" refers to a computer readable recording medium on which programs are recorded, which is used for the installation, execution, distribution and the like of the programs.

Examples of the recording medium may include a DVD (Digital Versatile Disc), "DVD-R, DVD-RW, DVD-RAM and the like" which are standards specified by the DVD Forum, "DVD+R, DVD+RW and the like" which are standards specified by DVD+RW, a CD (Compact Disc), a CD-ROM (Compact Disc-Read Only Memory), a CD-R (CD-Recordable), a CD-RW (CD-Rewritable), a Blu-ray Disc®, a MO (Magneto-Optical disk), a ED (Flexible Disk), a magnetic tape, a hard disk, ROM (Read Only Memory), EEPROM (Electrically Erasable and Programmable ROM), a flash memory, RAM (Random Access Memory), etc.

All or some of the programs may be recorded on the recording medium for storage, distribution or the like. In addition, the programs may be transported using any transmission medium such as a wired network, a wireless communication network or a combination thereof used for, for example, a LAN (Local Area Network), a MAN (Metropolitan Area Network), a WAN (Wide Area Network), the Internet, an Intranet, an Extranet and so on, or may be loaded on a carrier wave for transmission.

In addition, the programs may be a portion of other programs or may be recorded on a recording medium along with different programs. In addition, the programs may be recorded in such a manner so as to be distributed over a plurality of recording media. Moreover, the programs may be recorded in random formats including compression, encryption or the like as long as they are reproducible.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a first path information calculating unit that calculates first path information which is information representing a first path, the first path separating a partial image from an image;
 a second path information calculating unit that calculates second path information which is information representing a second path, the second path separating the partial image from the image, the second path being the reverse of the first path;

wherein at least one of the first path information or the second path information include a path cost, wherein the path cost includes an accumulative value of luminescence values of pixels on the path; and a path selecting unit that select one of the first path information calculated by the first path information calculating unit and the second path information calculated by the second path information calculating unit.

2. The image processing apparatus according to claim 1, wherein the first path and the second path are paths where an accumulative value of luminescence values of pixels on the paths satisfies a predetermined condition.

3. The image processing apparatus according to claim 1, wherein the second path information calculating unit calculates the second path information based on the first path information calculated by the first path information calculating unit, and wherein the first path information calculating unit calculates the first path information based on the second path information calculated by the second path information calculating unit in processes after the second path information is calculated by the second path information calculation unit.

4. The image processing apparatus according to claim 2, wherein the second path information calculating unit calculates the second path information based on the first path information calculated by the first path information calculating unit, and wherein the first path information calculating unit calculates the first path information based on the second path information calculated by the second path information calculating unit in processes after the second path information is calculated by the second path information calculation unit.

5. The image processing apparatus according to claim 3, wherein conditions on termination of the process by the first path information calculating unit and the process by the second path information calculating unit are that the processes are performed a given number of times or that the first path information coincides with the second path information.

6. The image processing apparatus according to claim 4, wherein conditions on termination of the process by the first path information calculating unit and the process by the second path information calculating unit are that the processes are performed a given number of times or that the first path information coincides with the second path information.

7. A non-transitory computer readable medium storing a program causing a computer to execute a process for image processing, the process comprising:

calculating first path information which is information representing a first path, the first path separating a partial image from an image;

calculating second path information which is information representing a second path, the second path separating the partial image from the image, the second path being the reverse of the first path;

calculating a path cost included in at least one of the first path information or the second path information, the path cost including an accumulative value of luminescence values of pixels on the path; and selecting one of the first path information and the second path information.

* * * * *